US011441289B2

(12) United States Patent
Zeng et al.

(10) Patent No.: US 11,441,289 B2
(45) Date of Patent: Sep. 13, 2022

(54) HYBRID FOUNDATION FOR OFFSHORE WIND TURBINES

(71) Applicant: Case Western Reserve University, Cleveland, OH (US)

(72) Inventors: Xiangwu Zeng, Solon, OH (US); Xuefei Wang, Cleveland Heights, OH (US); Xu Yang, Tianjin (CN); Xinyao Li, Cleveland, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 0 days.

(21) Appl. No.: 17/282,890

(22) PCT Filed: Oct. 7, 2019

(86) PCT No.: PCT/US2019/055030
§ 371 (c)(1),
(2) Date: Apr. 5, 2021

(87) PCT Pub. No.: WO2020/073046
PCT Pub. Date: Apr. 9, 2020

(65) Prior Publication Data
US 2022/0002962 A1    Jan. 6, 2022

Related U.S. Application Data (60) Provisional application No. 62/741,872, filed on Oct. 5, 2018.

(51) Int. Cl.
*E02D 27/42* (2006.01)
*F03D 13/25* (2016.01)
*F03D 13/20* (2016.01)
*E02D 27/52* (2006.01)

(52) U.S. Cl.
CPC ......... *E02D 27/425* (2013.01); *E02D 27/525* (2013.01); *F03D 13/22* (2016.05); *F03D 13/25* (2016.05)

(58) Field of Classification Search
CPC ........................... E02D 27/525; E02D 27/425
See application file for complete search history.

(56) References Cited

U.S. PATENT DOCUMENTS

2018/0195250 A1    7/2018  Nelson

FOREIGN PATENT DOCUMENTS

| CN | 104594377 A | 5/2015 |
| CN | 108560577 A | 9/2018 |
| EP | 3228754 A1 | 10/2017 |
| KR | 20130123050 A | 11/2013 |
| KR | 101445131 | * 9/2014 |
| WO | 2005038146 A1 | 4/2005 |

* cited by examiner

*Primary Examiner* — Sean D Andrish
(74) *Attorney, Agent, or Firm* — Tarolli, Sundheim, Covell & Tummino LLP (57) ABSTRACT

A hybrid offshore wind turbine includes a monopile, friction wheel, and suction bucket.

20 Claims, 11 Drawing Sheets

Fig. 5D (d) MFB(deep)

Fig. 5C (c) MFB(shallow)

Fig. 5B (b) MF

Fig. 5A (a) monopile

(a) Saturated loose sand

Fig. 6A

(b) Saturated dense sand

Fig. 6B

(c) Dry loose sand

Fig. 6C

(d) Dry dense sand

Fig. 6D

(a) Saturated loose sand

Fig. 7A

(b) Saturated dense sand

Fig. 7B (c) Dry loose sand

Fig. 7C (d) Dry dense sand

HYBRID FOUNDATION FOR OFFSHORE WIND TURBINES

RELATED APPLICATION

This application claims priority from U.S. Provisional Application No. 62/741,872, filed Oct. 5, 2018, the subject matter of which is incorporated herein by reference in its entirety.

GOVERNMENT FUNDING

This invention was made with government support under grant number DE-EE0006714 awarded by the Department of Energy. The United States Government has certain rights in the invention.

BACKGROUND

Harvesting energy from offshore wind alone could make a huge contribution to meet the entire world's need of energy consumption. As an energy solution with huge potential, plenty of successful offshore wind farms having hundreds of megawatts capacity have been producing electricity along many countries' coastline and many bigger projects are under construction. The development of offshore wind energy is currently at full throttle worldwide.

The main challenge of constructing a wind farm is its relatively high investment and the resulting high electricity price, which reduces its competitiveness in the energy market. Additionally, when erecting an offshore wind turbine (OWT), up to 35% of the total investment is spent on foundation work. Therefore, economic solutions for OWT foundations would significantly decrease the costs of the OWT, which would achieve further exploitation of offshore wind energy.

The harsh marine environment raises challenges for OWT foundations to keep their stability. Apart from static load from the self-weight of OWT components, strong wind driving turbine blades produces large bending moments, and force from currents and waves form large cyclic lateral loading. Also, to avoid resonance or fatigue damage, the frequency of OWT system (including foundation) should lie away from frequency of hub level vibration (often termed 1P) and frequency of tower vibration because of so-called blade shadowing effects (often termed 2P/3P). In addition, the type of OWT foundation determines the installation procedure, and vessels, which are crucial to the financial feasibility of projects. Therefore, many factors should be taken into consideration when designing foundations of OWTs.

Among many existing concepts, the most widely used solution of OWT foundation is a monopile foundation. Around 71% of OWTs are supported by monopile foundations, 12% by jacket foundations, 9% by high-rise pile cap foundations, 5% by gravity-based foundations, and 2% by tripod foundations. Efforts have been taken to achieve the ambition of harvesting energy from further and deeper ocean, as well as reducing the cost of foundation work. The future design of a monopile foundation is likely to have diameter up to 10 m, and for these larger diameter stiff monopile with high diameter length ratio, the traditional p-y curve methods, which is typically used for slender piles in oil and gas industry is no longer appropriate. Numerical modelling and field tests are conducted to develop new design method for large diameter monopile. But limited capacity of crane and driven hammer on the installation vessel as well as the increasing material cost is the major challenge of utilizing larger diameter stiff monopile.

SUMMARY

Embodiments described herein relate to a hybrid offshore wind turbine foundation that includes monopile, friction wheel, and bucket component. This new type of hybrid foundation takes advantages of the three types of foundations while overcoming their shortcomings, resulting in potentially improved safety and reduced cost of manufacturing and installation.

In some embodiments, the monopile can be elongated and extend from a first end to a distal second along an axis. The first end can be configured to be inserted into a sea floor and the second end can support the offshore wind turbine. The friction wheel can have an outer annular surface and an inner annular surface that defines an opening through which the monopile extends. The friction wheel can extend transverse to the axis and be configured to increase the lateral load bearing capacity of the monopile upon insertion into the sea floor. An annular suction bucket can extend from the friction wheel towards the first end of the monopile. The suction bucket can be configured to be driven into the sea floor by pressure differentiation within the bucket during installation of the hybrid foundation.

In some embodiments, the upper surface of the friction wheel is configured to extend above the sea floor upon installation of the hybrid foundation. In other embodiments, the friction wheel can be a substantially solid and/or contiguous structure and have an upper surface that extends from the outer annular surface to the inner annular surface. The lower surface of the friction wheel can be configured to extend substantially parallel to the sea floor.

In other embodiments, the outer annular surface is defined by an outer annular member and the inner annular surface is defined by an inner annular member different than the outer annular member. The outer annular member and the inner annular member can define an annular cavity in the friction wheel that is configured to receive and/or be filled with stone, rock, and/or gravel during installation of the hybrid foundation. The stone, rock, and/or gravel can be configured to provide vertical load to the hybrid foundation.

In some embodiments, the friction wheel includes at least one radially extending stiffener plate that prevents the friction wheel from buckling during and/or after installation of the hybrid foundation.

In some embodiments, the suction bucket can include an annular wall that extends along the axis toward the first end of the monopile. The annular wall defines a cavity through which the first end of the monopile extends. The cavity of the bucket can be divided into several compartments to increase its stiffness and maintain balance of the bucket by controlling pressure differentiation (e.g., vacuum) in different compartments during installation of the bucket and hybrid foundation.

In some embodiments, the annular wall and/or the suction bucket and the friction wheel can have substantially the same outer diameter.

In still other embodiments, the friction wheel can be coupled to the suction bucket. In other embodiments, the friction wheel can be integral with the suction bucket.

In some embodiments, the friction wheel and suction bucket can be coupled to the monopile such that the resisting moment created by the friction wheel and bucket suction after installation of the hybrid foundation transfers to the monopile and tower.

DETAILED DESCRIPTION

Embodiments described herein relate to a hybrid offshore wind turbine foundation that includes a monopile, a friction wheel, and a suction bucket component. This new type of hybrid foundation takes advantages of the three types of foundations while overcoming their shortcomings, resulting in potentially improved safety and reduced cost of manufacturing and installation.

Figure 1:
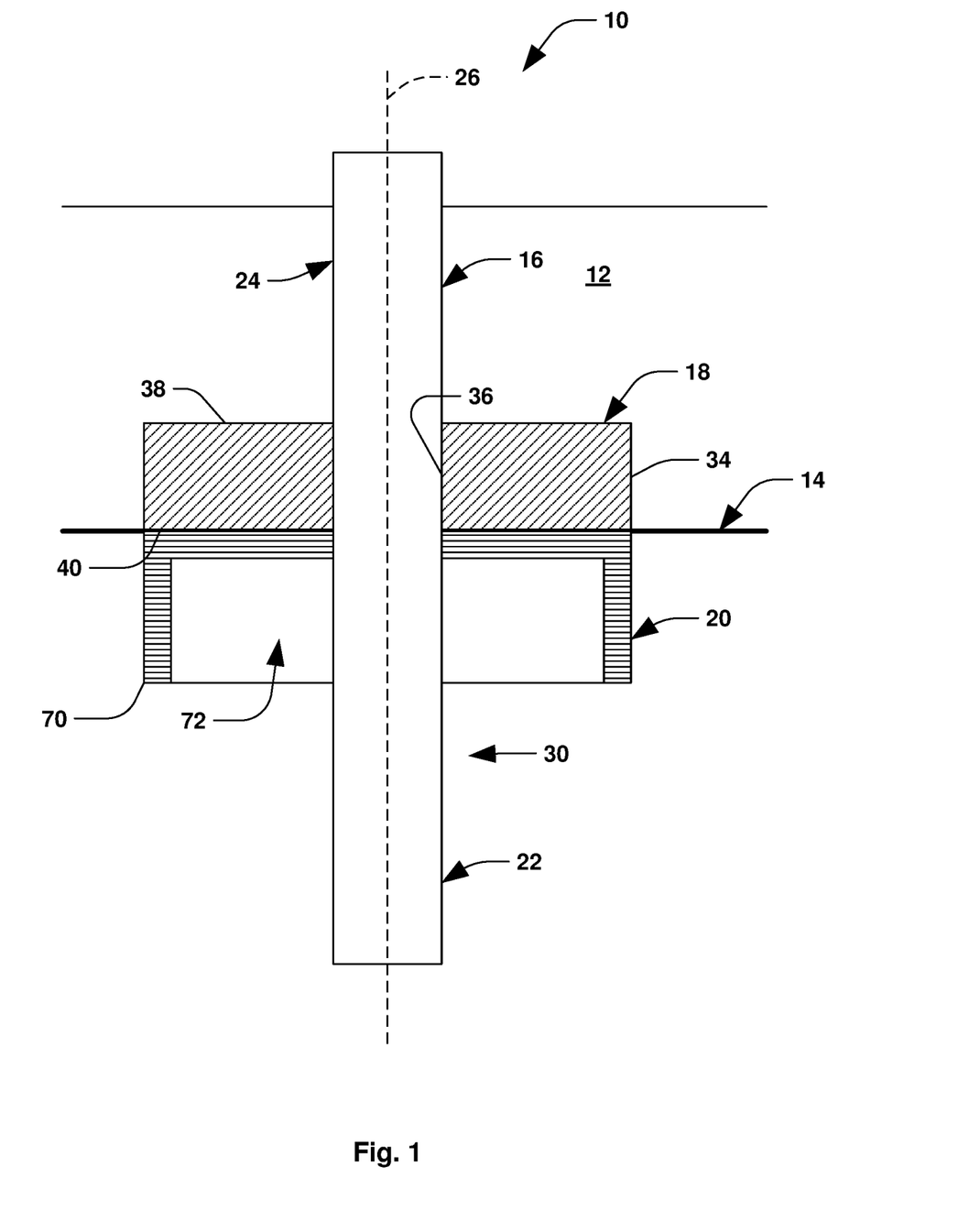
FIG. 1 illustrate a cross sectional view of hybrid offshore wind turbine (OWT) foundation in accordance with one embodiment.

FIG. 1 illustrates a cross-section view of a hybrid foundation 10 for an offshore wind turbine in accordance with an embodiment described herein. The hybrid foundation 10 is in the installed position, i.e., in the sea 12 and driven into the sea floor 14, and includes a monopile 16, friction wheel 18, and suction bucket 20. The monopile 16 can receive a tower structure of a wind turbine generator or a platform for an electrical substation of a wind farm. The monopile 16 can be elongated and extend from a first end 22 to a distal second end 24 along an axis 26. The first end 22 can be configured to be inserted into a sea floor 14 and the second end 24 can receive and/or support a wind turbine generator or a platform for an electrical substation of a wind farm (not shown). The second end 24 can also include, for example, a flange for establishing a bolted construction to another steel cylinder (not shown), pile section or connection profile of an offshore structure.

In some embodiments, the monopile 16 can be substantially cylindrical and have a diameter of about 1 to about 10 meters, for example, about 3 to about 8 meters or about 4 to about 5 meters. The monopile can also have a regular wall thickness of about 4 to about 10 cm, for example, about 4 cm to about 6 cm. The monopile 16 can be designed as a cylindrical tube of steel, which can be painted or coated to withstand the influence of sea water.

FIG. 1 shows the monopile 16 in the installed position with reference 14 denoting the mud line or sea floor. Above the sea floor 14, the monopile 16 extends through the sea 12. A portion 30 of the monopile 16 that extends or is sunk into the sea floor 14 includes the first end 22.

The friction wheel 18 can have an outer annular surface 34 and an inner annular surface 36 that defines an opening through which the monopile extends 16. The friction wheel 18 can extend transverse to the axis 26 and be configured to increase the lateral load bearing capacity of the monopile 16 upon insertion into the sea floor 14.

An upper surface 38 of the friction wheel 18 is configured to extend above the sea floor 14 upon installation of the hybrid foundation 10. In some embodiments, the friction wheel 18 can be a substantially solid and/or contiguous structure and have an upper surface 38 that extends from the outer annular surface 34 to the inner annular surface 36. The lower surface 40 of the friction wheel 18 can be configured to extend substantially parallel to the sea floor 14. In some embodiments, the friction wheel 18 includes at least one radially extending stiffener plates (not shown) that prevents the friction wheel 18 from buckling during and/or after installation of the hybrid foundation.

Figure 2:
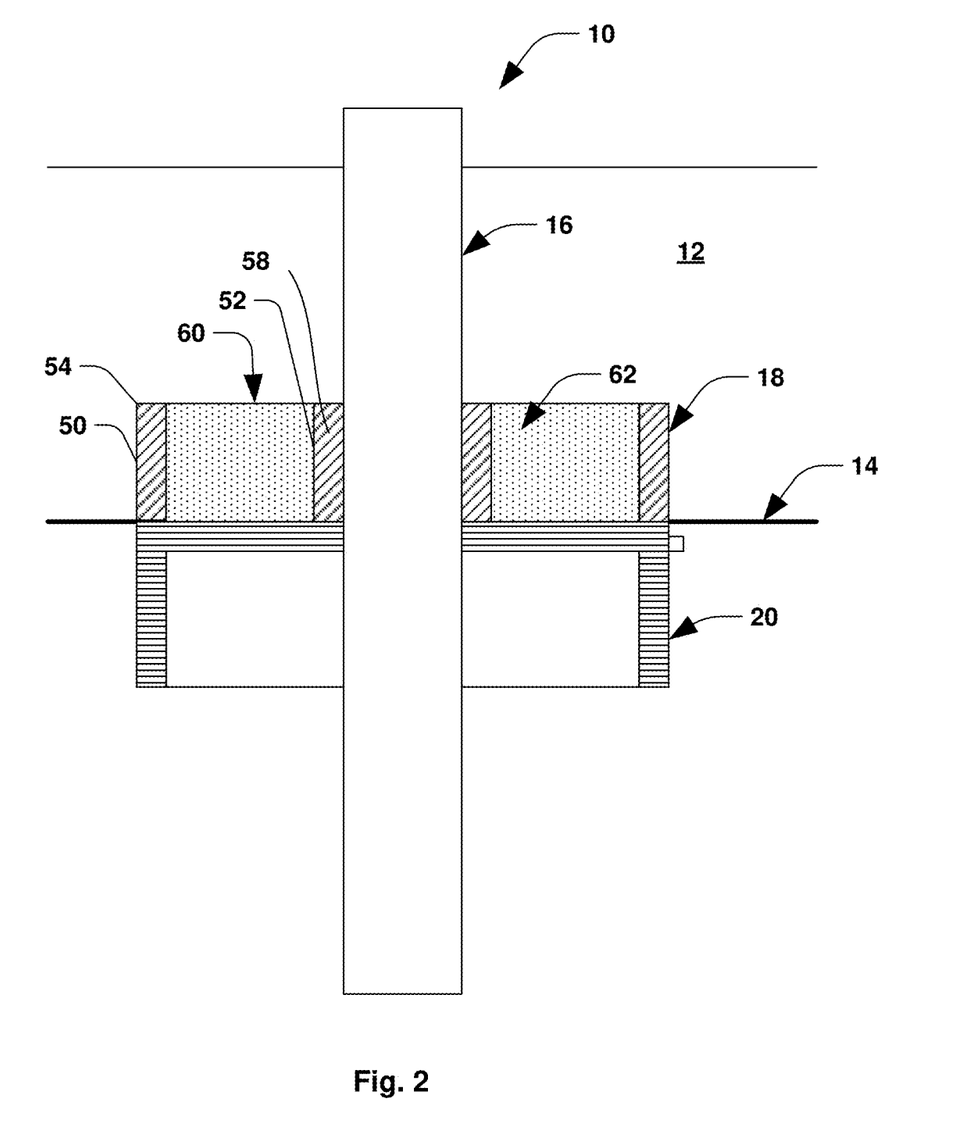
FIG. 2 illustrates a cross sectional view of a hybrid OWT foundation in accordance with another embodiment.

In other embodiments, as illustrated in FIG. 2, the friction wheel 18 can include an outer annular surface 50 and inner annular surface 52 that is defined by an outer annular member 54 and inner annular member 58, respectively. The outer annular member 54 and inner annular member 58 can define a single annular cavity 60 in the friction wheel 18 that can be configured to receive and/or be filled with stone, rock, and/or gravel 62 during installation of the hybrid foundation 10. The stone, rock, and/or gravel 62 can be configured to provide vertical load to the hybrid foundation 10. In other embodiments, the friction wheel can include multiple cavities (not shown), such as multiple annular cavities, that are defined, for example, by an outer annular member and an inner annular member.

In some embodiments, the friction wheel 18 can have an outer diameter of about 2 meters, about 2.5 meters, about 3 meters, about 3.5 meters, about 4 meters, about 4.5 meters, about 5 meters, about 5.5 meters, about 6 meters, about 6.5 meters, about 7 meters, about 7.5 meters, about 8 meters, about 8.5 meters, about 9 meters or more, and a height or thickness of about 0.5 meters, about 1 meter, about 1.5 meters, about 2 meters, about 2.5 meters, about 3 meters, or about 3.5 meters. The ratio of the outer diameter of the friction wheel 18 to the length of the first end 22 of the monopile embedded in the sea floor can be about 0.25/1, about 0.5/1, about 0.75/1, about 1/1, about 1.25/1, or about 1.5/1.

The suction bucket 20 can have an annular wall 70 that extends along the axis 26 from the friction wheel 18 towards the first end 22 of the monopile. The suction bucket 20 can be configured to be driven into the sea floor 14 by pressure differentiation within the bucket 20 during installation of the hybrid foundation 10.

The annular wall 70 defines a cavity 72 through which the first end 22 of the monopile 16 extends. The cavity 72 of the bucket 20 can be divided into several compartments to increase its stiffness and maintain balance of the bucket 20 by controlling pressure differentiation (e.g., vacuum) in different compartments during installation of the bucket 20 and hybrid foundation 10.

In some embodiments, the annular wall 70 and/or the suction bucket 20 can have an outer diameter of an outer diameter of about 2 meters, about 2.5 meters, about 3 meters, about 3.5 meters, about 4 meters, about 4.5 meters, about 5 meters, about 5.5 meters, about 6 meters, about 6.5 meters, about 7 meters, about 7.5 meters, about 8 meters, about 8.5 meters, about 9 meters or more, and a height of about 0.5 meters, about 1 meter, about 1.5 meters, about 2 meters, about 2.5 meters, about 3 meters, or about 3.5 meters. In other embodiments, the suction bucket 20 and the friction wheel 18 can have substantially the same outer diameter.

In some embodiments, the friction wheel 18 can be coupled to the suction bucket 20, by bolts, welding, and or other fastening means. In other embodiments, the friction wheel 18 can be integral with the suction bucket 20.

In some embodiments, the friction wheel 18 and suction bucket 20 can be coupled to the monopile 16 such that the resisting moment created by the friction wheel 18 and suction bucket 20 after installation of the hybrid foundation 10 transfers to the monopile 16.

Additionally or optionally, the suction bucket 20 may be configured for coupling with a pump system. In one example, the suction bucket 20 may include a valve element (not shown) for coupling the suction bucket to a hose (not shown) of a pump system (not shown). The valve element may represent a controlling means for supplying a pressure differential to the bucket 20. In general, any known device configured to provide a controlling operation when supplying a pressure differential to a suction bucket 20 may be used such that a pressure supply to the suction bucket 20 may be controlled and a predetermined pressure may be adjusted. Therefore, alternatively, the suction buckets 20 may be coupled to a pressure reservoir by some coupling means, such as a hose or the like, and some controlling means may be represented, for example, by a valve element of the reservoir or any other means suitable for controlling release of pressure from the pressure reservoir and/or transmission of pressure from the pressure reservoir to the suction bucket 20.

Upon supplying a negative pressure to the suction bucket, particularly by pumping out water from the interior of the suction bucket 20 by means of the pumping system, a pressure difference relative to the pressure of the sea above or acting on the suction bucket is created, as indicated by arrows. Upon pumping out the water from the suction bucket and the pressure difference relative to the water pressure outside the suction bucket, the suction bucket easily and rapidly penetrates the sea floor during installation.

FIGS. 1 and 2 illustrate the suction bucket 20 having penetrated into the seafloor. When stopping the pumping of water out of the suction bucket 20, a strong anchoring of the suction bucket 20 within the sea floor 14 is provided, as, for pulling out the suction bucket 20, a high force is necessary in order to overcome the vacuum relative to the surrounding water pressure implemented by the amount of water pumped out from the suction bucket 20.

The suction bucket 20 may be released from the seafloor 14 by pumping water into the suction bucket 20, which therefore pushes the suction bucket 20 out from its anchoring position in the sea floor 14. Therefore, the solid and reliable anchoring of the suction bucket 20 may be easily released by pumping water into the suction bucket 20 and supplying a positive pressure to the suction bucket 20, respectively. Releasing of the suction bucket 20 may be further supported by additionally applying a lifting force to the suction bucket 20 and/or the monopile 16 and/or friction wheel 18 concurrently with supplying the positive pressure and pumping water into the suction bucket 20, respectively.

The following examples are included to demonstrate different embodiments of the invention. It should be appreciated by those of skill in the art that the techniques disclosed in the examples, which follow represent techniques discovered by the inventor to function well in the practice of the claimed embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the claims.

Example

To evaluate the ultimate lateral bearing capacity of a hybrid foundation system, a series of 1:50 centrifuge tests on dry/saturated and loose/dense sand soil condition were conducted. Four foundation model are compared in the experiment: monopile, monopile-friction wheel (MF), monopile-friction wheel-bucket (MFB) foundation with shallow and deep bucket depth. Monotonic lateral loads are applied above the ground 3.25 m of OWT tower. Ultimate lateral bearing capacity are estimated by different methods and also the lateral stiffness of the hybrid system demonstrates its considerable potential of resistance under massive lateral load. Additionally, by comparing the shallow and deep MFB hybrid foundation, it is shown that the addition of a relative shallow bucket into the hybrid system is an efficient complement which increases the capacity of the foundation significantly, while a deeper bucket does not enhance the bearing capacity too much comparing with the increase of cost.

Geotechnical Centrifuge Test Set Up

An artificial gravity is acted on a model test set up when performing centrifuge test by placing the model at the end of a long rotating arm. This is done to ensure that the stress in the model soil is the same as the stress at the corresponding point in the prototype which is important because of the nonlinear stress-strain relationship of soil. Therefore, geotechnical centrifuge is an economical and effective way to investigate the mechanism characteristic of structure-soil interaction and it can be used to verify the 1G test and numerical simulation.

Figure 4:
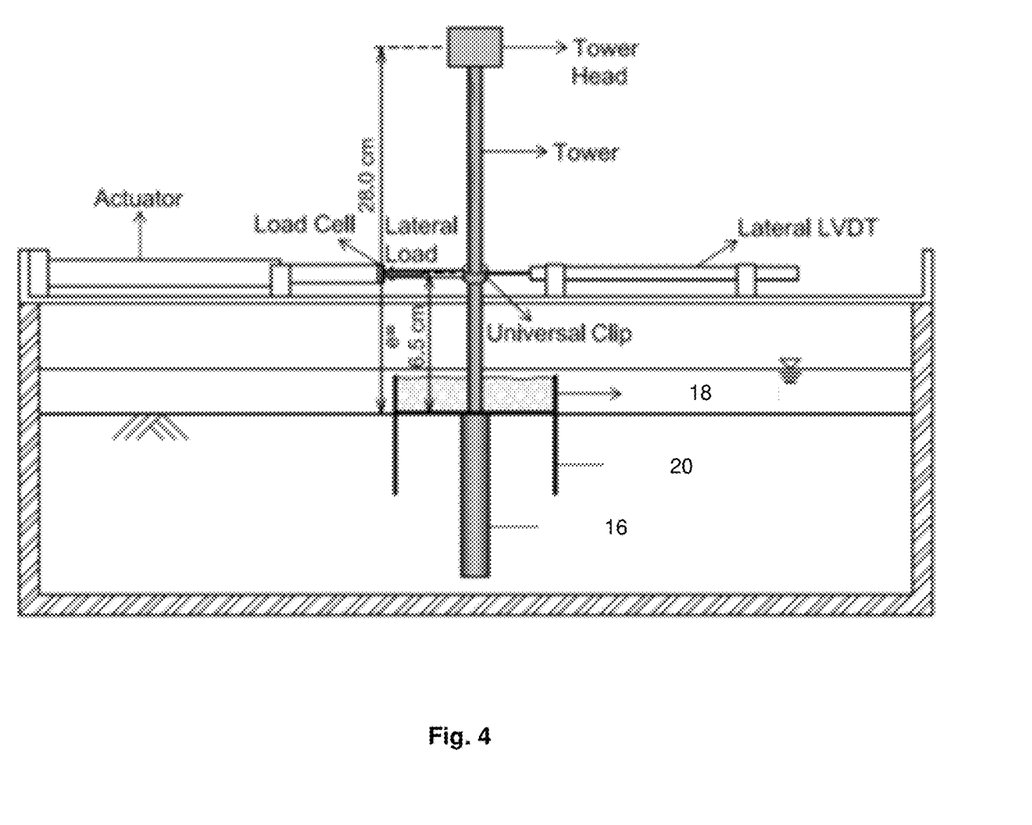
FIG. 4 illustrates a centrifuge test package.
Figure 5A:
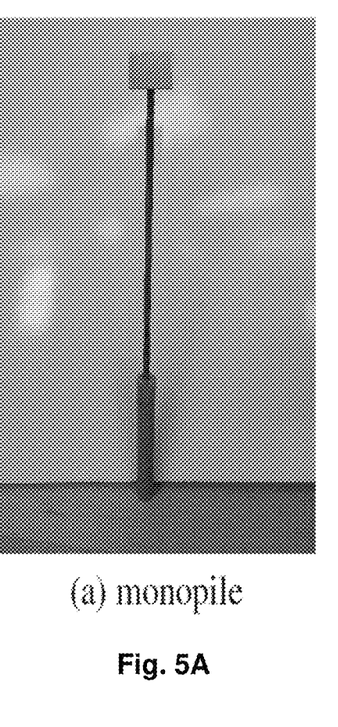
FIGS. 5(A)-(D) illustrates pictures of (A) monopile, (B) monopile-friction wheel (MF), (C) monopile-friction wheel-shallow bucket (MFB(shallow)), (D) and monopile-friction wheel-deep bucket (MFB(deep)) foundation centrifuge testing model.
Figure 5B:
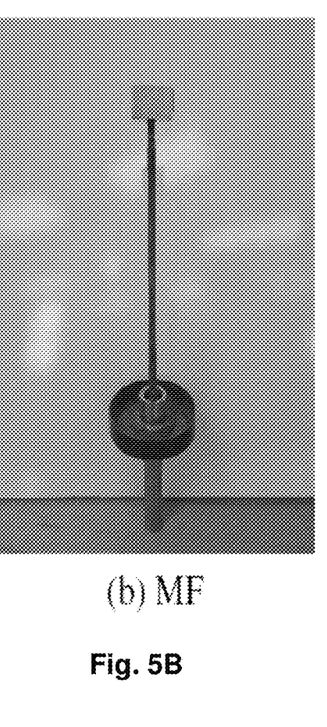
Figure 5C:
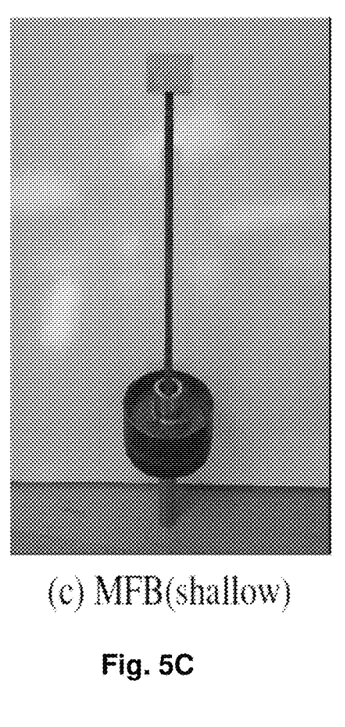
Figure 5D:
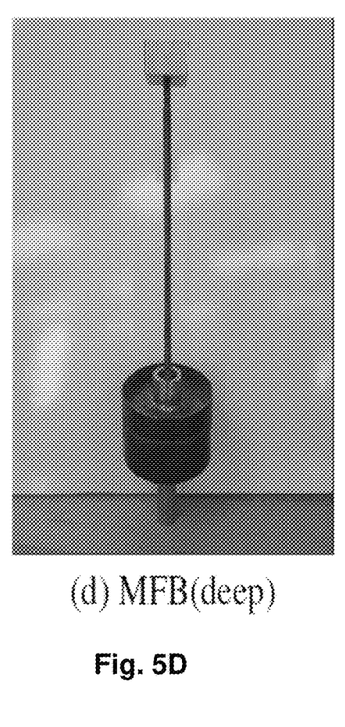
Figure 6A:
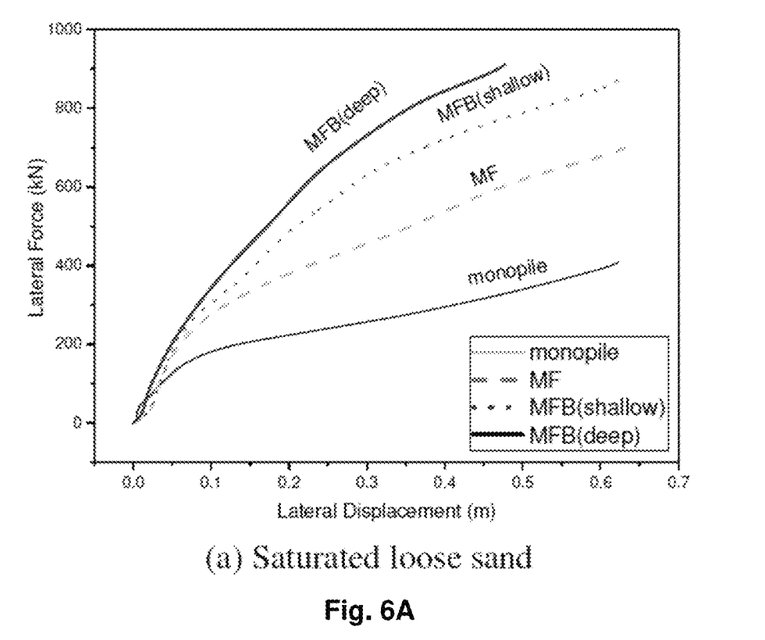
FIGS. 6(A)-(D) illustrate lateral load-lateral displacement curve of all 16 tests for (A) saturated loose sand, (B) saturated dense sand, (C) dry loose sand, and (D) dry dense sand.
Figure 6B:
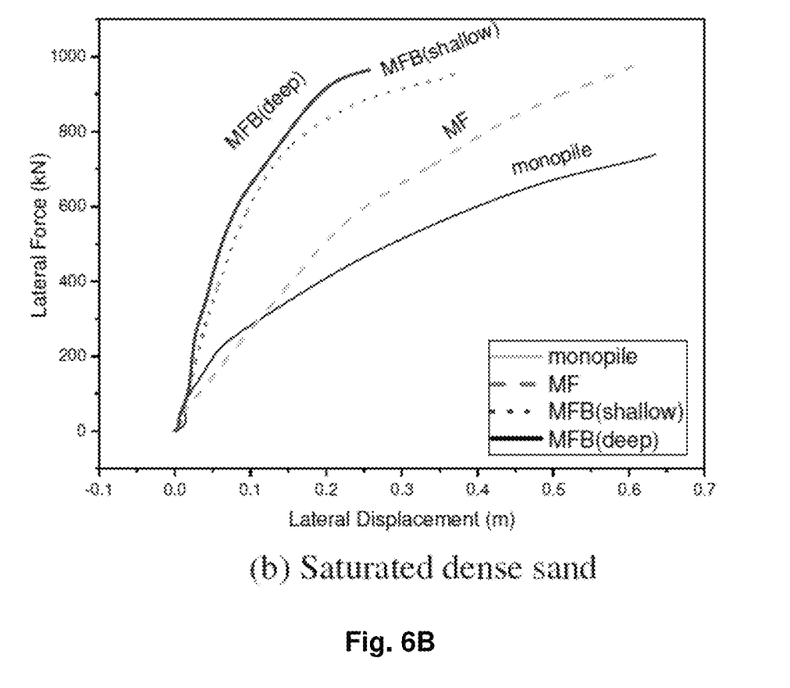
Figure 6C:
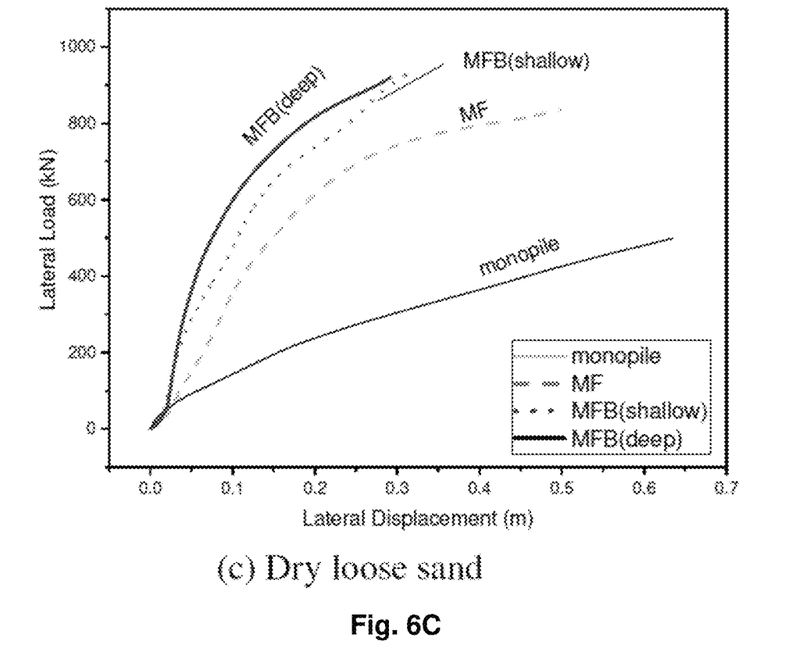
Figure 6D:
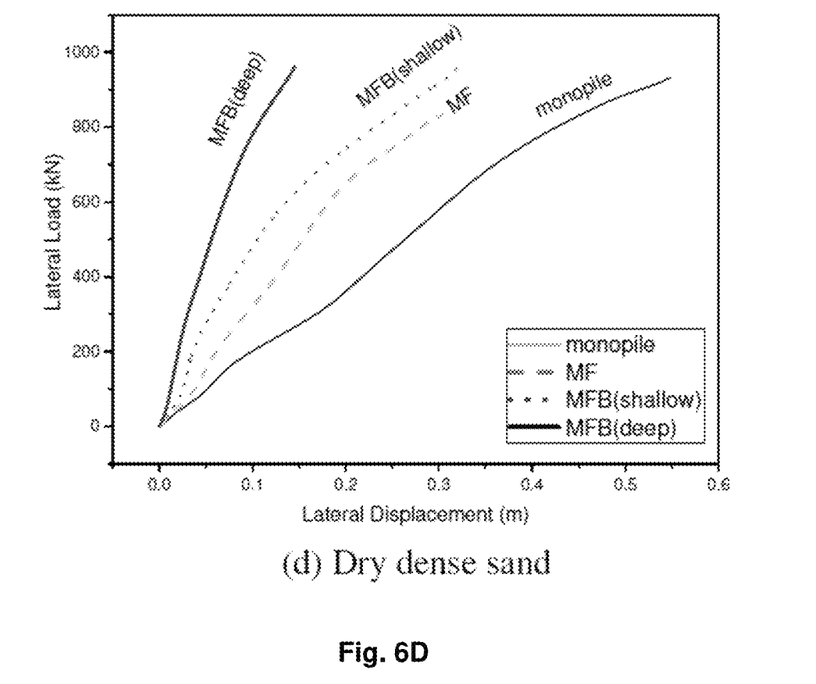

The tests described herein were performed on Case Western Reserve University Geotechnical Centrifuge. The centrifuge payload capacity is 20 g-ton with a maximum acceleration of 200 g for static tests and 100 g for dynamic tests. The centrifuge arm has a radius of 1.07 m while the dual platforms lie at a radius of 1.37 m during flight and can carry payloads of up to 182 kg. The test package is presented in FIG. 4. The artificial acceleration of the tests is 50 g and all the dimensions and data are presented in prototype scale apart from the test package description.

Figure 3A:
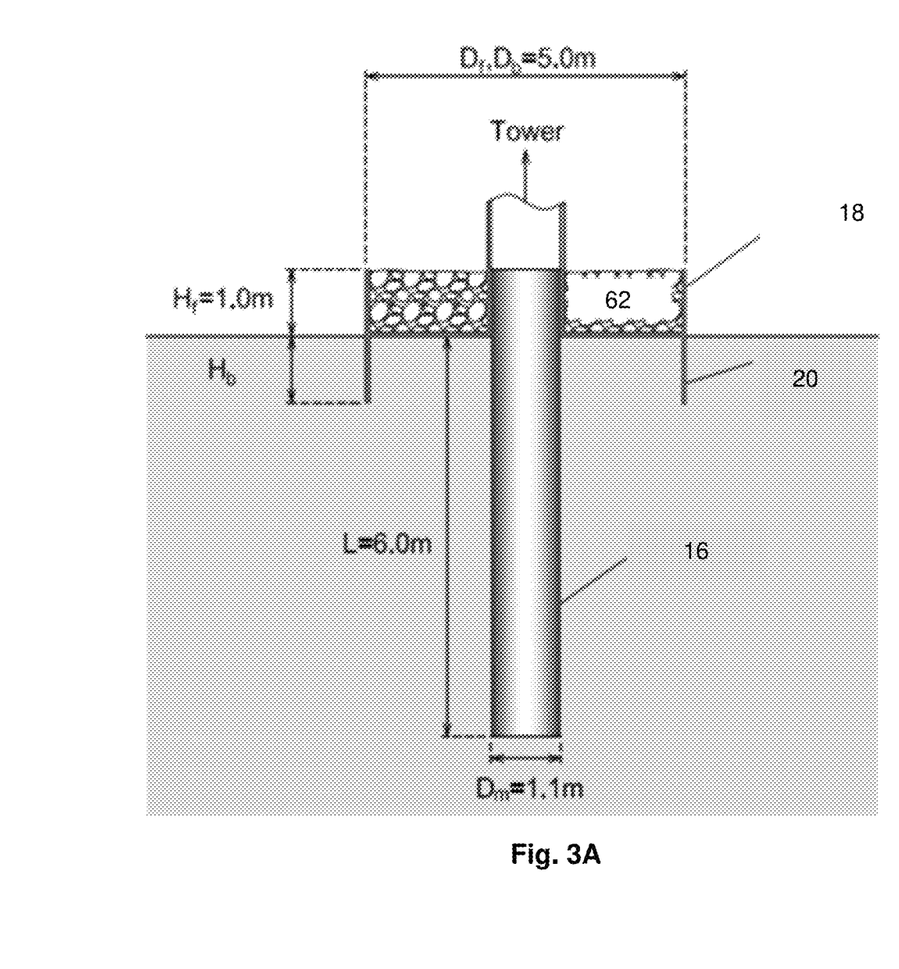
FIGS. 3(A)-(B) illustrates a scheme of hybrid OWT foundation.
Figure 3B:
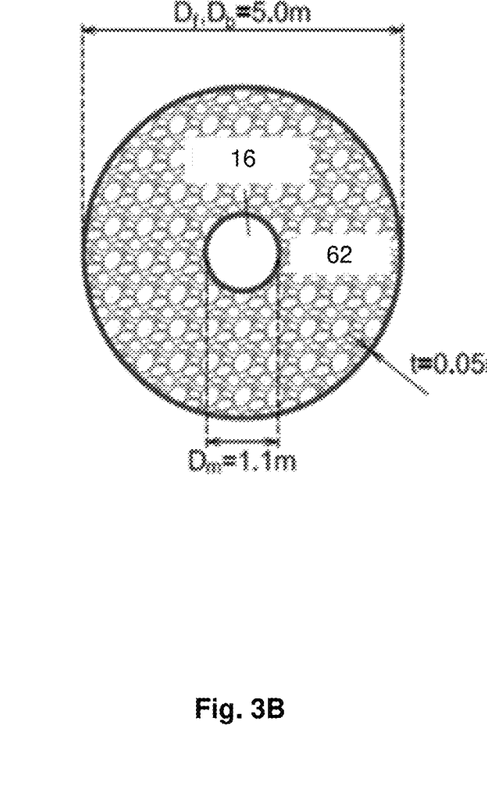

4 OWT foundation models were tested in this research: monopile foundation, monopile-friction wheel (MF) foundation, two monopile-friction wheel-bucket (MFB) hybrid foundations with shallow and deep bucket respectively. The bucket depth $H_b$ of MFB(shallow) is 1m and 2m for MFB (deep). The configuration of all 4 models are shown in FIGS. 5(A)-(D). The length of the monopile L is 7 m and the diameter of the pile $D_m$ is 1.1m. The embedded length of the pile is 6 m and the height of the OWT tower is 14 m. The nacelle of the turbine is simplified by a solid aluminum cube fixed on the top of the tower to simulate the weight of the upper structure. The total weight of the upper structure is 38.25 ton. The diameter of the friction wheel $D_f$ is 5 m and the height is 1 m. The thickness of the outside wall is 5 cm. The diameter of the bucket $D_b$ is the same as $D_f$. All the dimensions are shown in FIG. 3. In the model, the friction wheel and bucket are two different parts fixed together by bolts, while in prototype the friction wheel and bucket are an integral component.

TABLE 1

Information of centrifuge tests

| Test No. | Foundation type | Soil condition |
|---|---|---|
| 1 | Monopile | Saturated loose |
| 2 | MF | Saturated loose |
| 3 | MFB(Shallow) | Saturated loose |
| 4 | MFB(Deep) | Saturated loose |
| 5 | Monopile | Saturated dense |
| 6 | MF | Saturated dense |
| 7 | MFB(Shallow) | Saturated dense |
| 8 | MFB(Deep) | Saturated dense |
| 9 | Monopile | Dry loose |
| 10 | MF | Dry loose |
| 11 | MFB(Shallow) | Dry loose |
| 12 | MFB(Deep) | Dry loose |
| 13 | Monopile | Dry dense |
| 14 | MF | Dry dense |
| 15 | MFB(Shallow) | Dry dense |
| 16 | MFB(Deep) | Dry dense |

The sand used in this test is standard Toyoura sand with a mean particle size of 0.17 mm, specific gravity of 2.65, and void ratio of 0.6 and 0.98. Four soil conditions were prepared as loose saturated sand, dense saturated sand, loose dry sand and dense dry sand. The relative density is 30% for loose sand and 70% for dense sand. The soil sample were prepared by air pluviation method: dry sand was poured into the test container with constant heights and additional compaction was required to prepare for the desired relative density; de-aired water flowed in from the bottom slowly, and vacuum was o for at least 24 hours for saturation. The effective unit weight was 8.6 $kN/m^3$ for loose sand and 9.6 $kN/m^3$ for dense sand. The internal friction angle was determined by direct shear test. The critical friction angle was found to be 31° for both soil condition, and it was not influenced significantly by initial relative density. Peak friction angles were associated with dilation angle, and they were estimated to be 32.5° for loose sand and 36° for dense sand.

The foundations were installed by pushing in under 1 g gravity condition. There are two observation and ventilation holes on the horizontal ring panel between friction wheel and bucket to ensure the solid contact between the ground and the bottom of the friction wheel. Since the aspect ratio of the pile L/D=5.45, it could be categorized as a rigid pile. Therefore, unlike the slender pile, the pivot point of rotation locates above the pile tip. So there are some room left between the pile tip and soil box to allow movement of pile tip. The information of all tests are listed in Table 1.

Centrifuge Test Results 16 centrifuge tests are conducted on different types of foundation and soil condition. Monotonically increasing linear lateral load from 0 to 1.11 MN was acted horizontally above the ground line at a height of e=3.25m on the tower and the linear variable displacement transducer (LVDT) records the lateral displacement at the same height, which is presented in FIG. 4.

The relationships between the recorded lateral displacement and lateral load are shown in FIGS. 6(A)-(D). It is obvious that the tendency for every soil condition is very similar. The lateral load-displacement curves always lay in this order, MFB(deep)>MFB(shallow)>MF>monopile. Since the foundation model is installed at first, and then actuator and LVDT system was mounted on the soil box, the foundation may be disturbed by this process and the very starting phase of the curve shows a little bit deviation from the linear tendency. But the general pattern of the curves won't be influenced too much. In saturated loose sand, as demonstrated in FIG. 6 (A), the monopile responds linearly with the increase of the lateral load at the initial part of the curve, followed by a nonlinear section and then reaches a plateau presenting the failure of the foundation. While for MF, MFB foundation, the linear section of the curve is longer and the transition from linear to nonlinear is smoother than monopile. Additionally, at the end of the curve, the lateral loads tend to increase continuously with a gradually decreasing rate instead of reaching a significant plateau. For both loose (FIG. 6A) and dense saturated sand (FIG. 6B), by simply visual estimation, the ultimate lateral bearing capacity of MFB foundation is more than 2 times of the bearing capacity of monopile and about 1.5 times of MF foundation. And for dry loose sand (FIG. 6C), the ultimate bearing capacity of MFB foundation is roughly 3 times of monopile and is slightly higher than MF foundation. For dry dense sand (FIG. 6D), the bearing capacity of all models increase significantly and the differential between MFB(shallow) and monopile is not very big like other soil condition but the MFB(deep) is very outstanding. It's worth noting that the addition of friction wheel would enhance the resistance of foundation significantly, and again, the addition of bucket section would also help increase the bearing capacity, but the deeper bucket won't contribute too much to the growth of ultimate bearing capacity in most cases except for dry dense sand. Therefore, a shallow bucket is an effective and economical complement for the hybrid system.

Figure 7A:
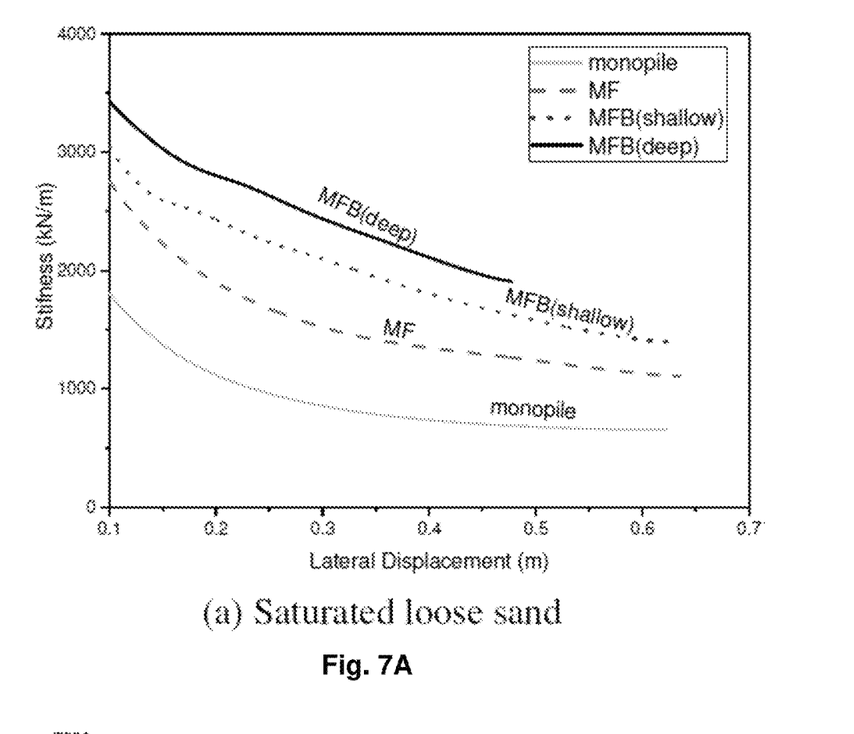
FIGS. 7(A)-(D) illustrate lateral stiffness-lateral displacement curve of 16 tests for (A) saturated loose sand, (B) saturated dense sand, (C) dry loose sand, and (D) dry dense sand.
Figure 7B:
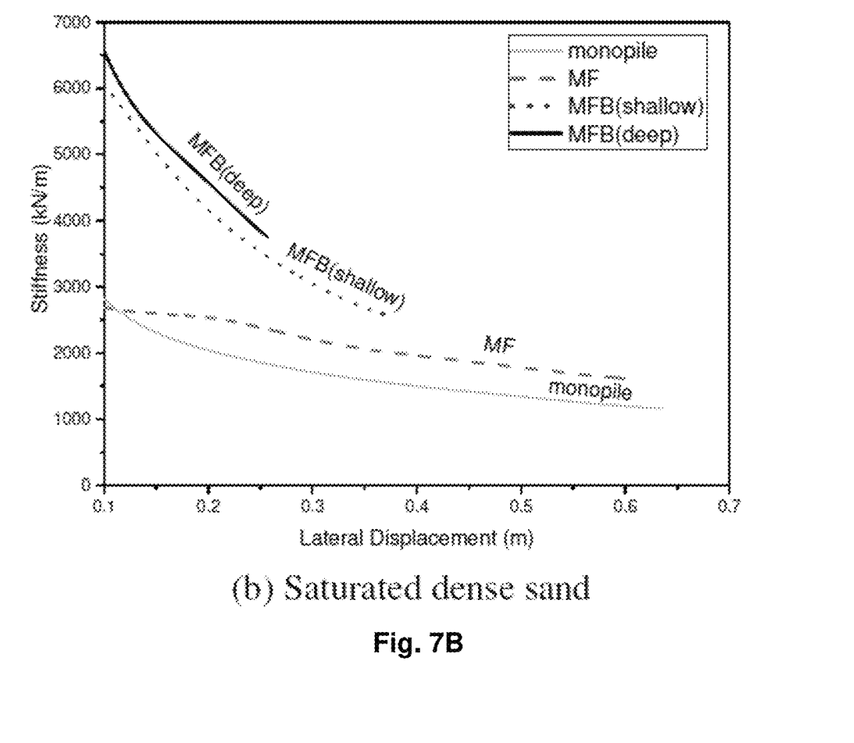
Figure 7C:
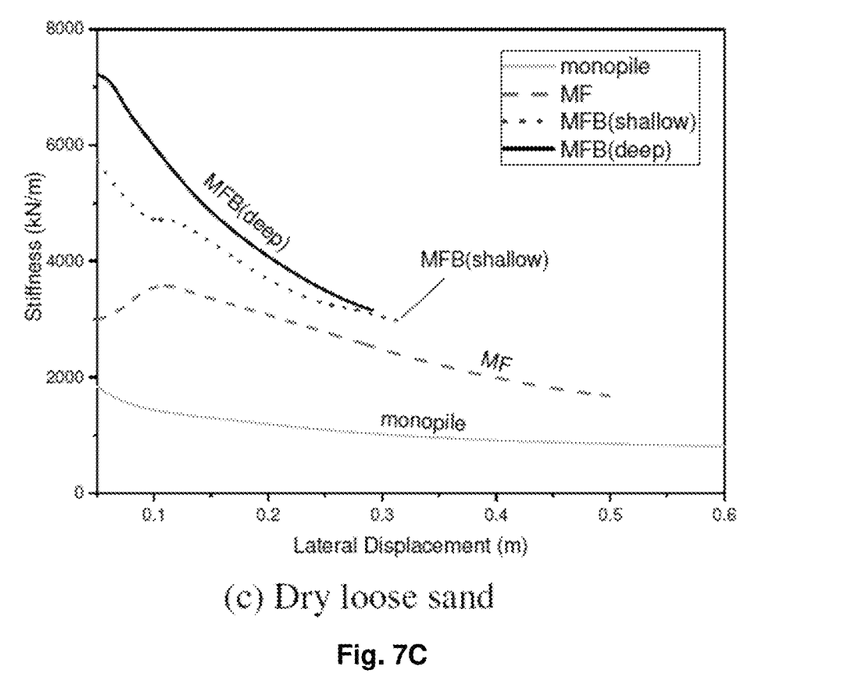
Figure 7D:
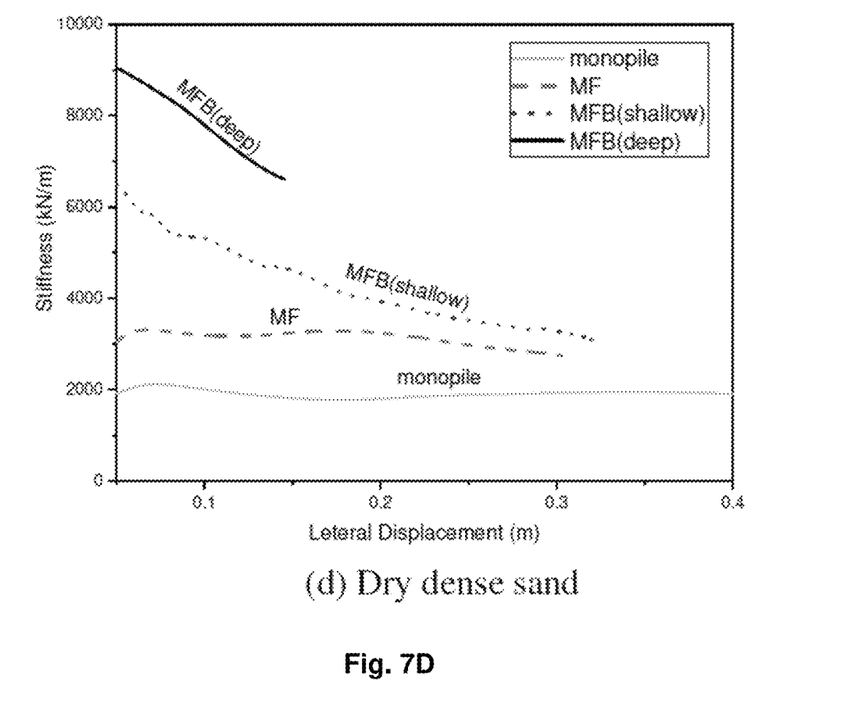
Figure 8A:
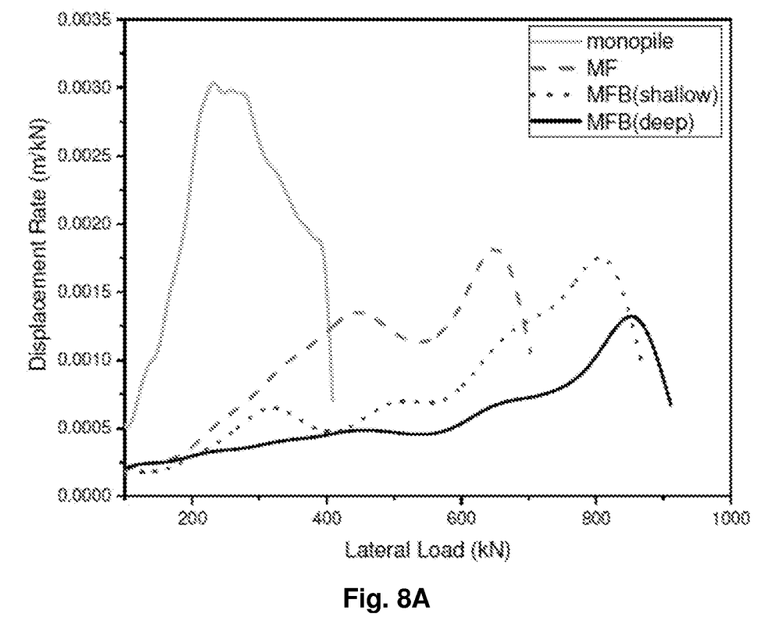
FIGS. 8(A)-(B) illustrate displacement rate-lateral load curve of saturated sand tests.
Figure 8B:
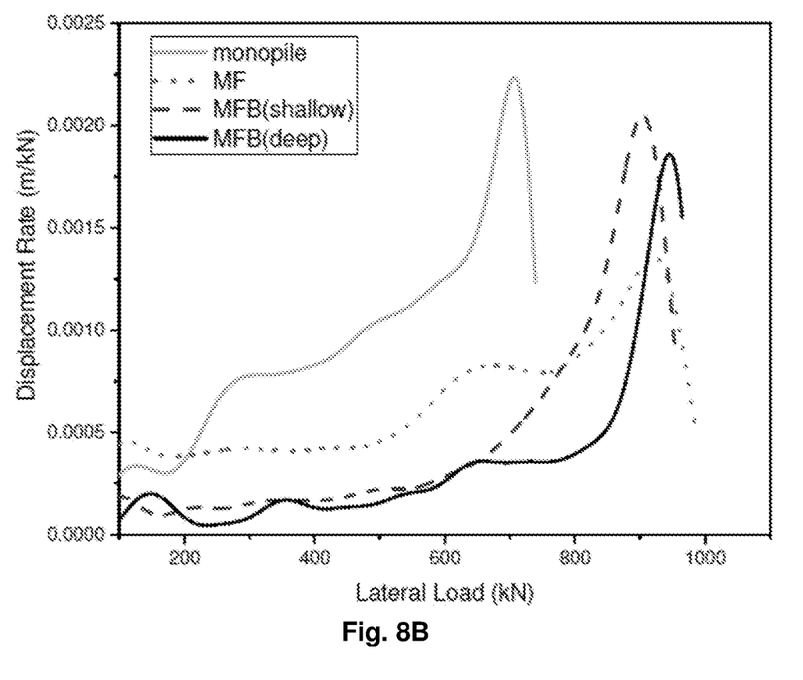

It's clear that the addition of friction wheel and bucket to the monopile outperforms the only monopile foundation in terms of lateral monotonic load. At the meantime, the hybrid foundation also enhances the lateral stiffness. The lateral stiffness is defined as the ratio of lateral load to lateral displacement. The relationships of lateral stiffness against lateral displacement of different foundation are presented in FIGS. 7(A)-(D). For all foundation models, the final lateral stiffness of hybrid system are all higher than monopile. For example, in saturated loose sand (FIG. 7(A), the final stiffness of MF and MFB(shallow) is about 2 and 2.5 times of monopile's stiffness respectively. Under some extreme loads like typhoon and hurricane, the lateral stiffness of large displacement may help the wind turbine survive the severe load condition. Consequently, the supplement of friction wheel and bucket components to the monopile would significantly enhance the lateral stiffness.

There are several methods to determine the ultimate bearing capacity from lateral load-lateral displacement curve. The starting linear phase of the curve is always considered as elastic deformation and the final flat phase is considered as plastic deformation. If the curve can be easily fitted with two straight lines at the starting and final phase of the curve, the intersection point of the two lines can be defined as ultimate bearing capacity; or it can be defined as the maximum curvature point on the curve; and it can also be determined by the most significant changing point on the curve. The last method can be achieved by plotting the displacement rate-lateral load curve and finding the maximum point on the curve. As the scale of the centrifuge test is 1:50, the soil box and foundation model is very small, some elements in the experiment like the isotropy of the soil and the nonlinearity of the relationship will be enlarged. Thus, the recorded curve may be distorted in some extent. In order to obtain a more plausible results of bearing capacity, the bearing capacity determined by the displacement rate need to be adjusted. We can use the second method, maximum curvature method, to correct the results we just get. The original results and adjusted results are show in Table 2. From the adjusted lateral bearing capacity, the MFB hybrid foundation outperforms the monopile foundation and MF hybrid foundation.

TABLE 2

| Soil condition | Foundation model | Calculated lateral bearing capacity of different foundation in saturated sand | |
|---|---|---|---|
| | | Lateral bearing capacity(kN) | Adjusted bearing capacity(kN) |
| Loose saturated sand | monopile | 232 | 232 |
| | MF | 649 | 300 |
| | MFB(shallow) | 804 | 650 |
| | MFB(deep) | 853 | 853 |
| Dense saturated sand | monopile | 705 | 280 |
| | MF | 912 | 550 |
| | MFB(shallow) | 904 | 800 |
| | MFB(deep) | 945 | 945 |

Analysis of Test Results

Figure 9:
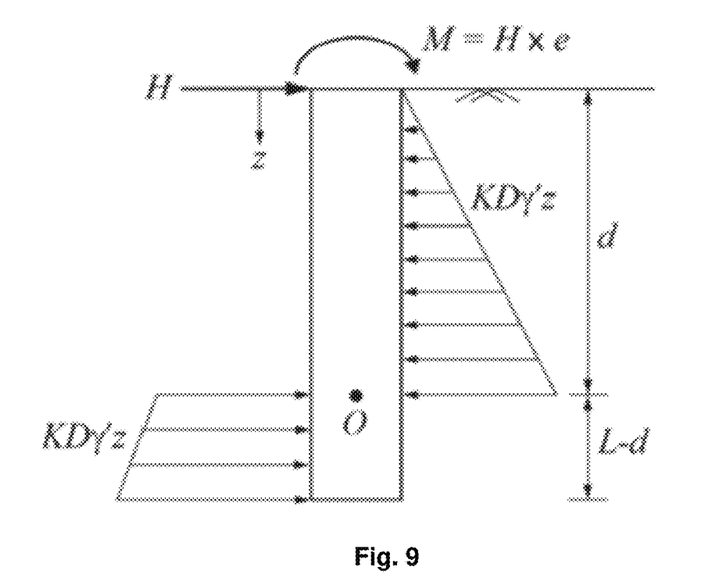
FIG. 9 illustrates simplified soil pressure distribution along pile.

Several theoretical methods for calculating the ultimate lateral bearing capacity of free headed laterally loaded stiff large diameter pile has been proposed and the soil resistance distribution along the pile length are simplified in different ways. The simplified soil pressure distribution of pile distributed is show in FIG. 9. Based on this method, the lateral bearing capacity is:

$$H = \frac{1}{2} KD\gamma'(2d^2 - L^2) \quad (1)$$

where D is pile diameter, d is depth of pivot point, and L is pile embedded length, K is a correction parameter, $\gamma'$ buoyant unit weight.

Some centrifuge tests and numerical simulation conclude d=0.7~0.8 L, so we can consider H as a function of $L^2$. For the case of loose saturated sand, the ultimate lateral bearing capacity of MFB(shallow) and MFB(deep) is around 2.8 and 3.7 times that of the monopile respectively. So the bearing capacity of shallow and deep MFB foundation offers the same level of performance with the monopile whose length is 1.7 L and 1.9 L of the reference monopile tested in the experiment. In saturated dense sand, the equivalent pile length will be longer.

Figure 10:
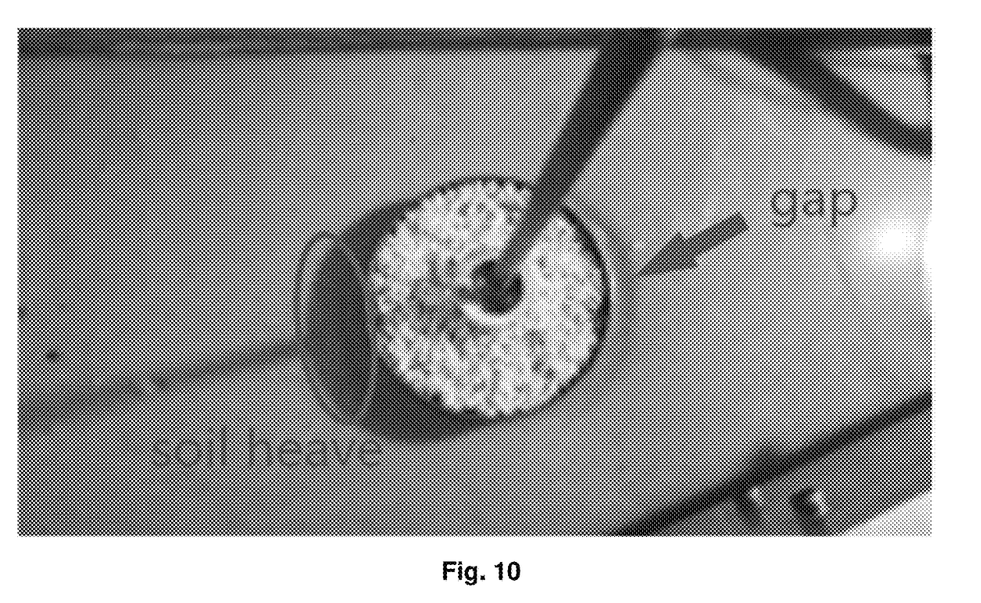
FIG. 10 illustrates post-test picture of test 9.

The only friction wheel section can be considered as a gravity-based foundation, it can be observed in the test that when failure of MF foundation happened, the front side of the friction wheel was pressed into the soil and a gap was formed on the rear side of the wheel, which is presented in FIG. 10. This phenomenon indicates that the contact area between the friction wheel and soil is eccentric to the front side of the wheel. According to a previous research, it is assumed that as the footing rotates, contact with the soil is lost and a reduced area of the foundation plate is used to compute the total reaction force from the soil. But the reduced area can provide an increasing resisting moment till the area becomes ½ of the original area. Since the existence of the friction wheel, the overturning moment of the foundation is transmitted into the ground and the rocking stiffness of the foundation is enhanced.

The lateral bearing capacity of bucket foundation can be calculated by:

$$Q_H = E_P + R_H E_a \quad (2)$$

where $E_P$ is the total passive earth pressure on the side of foundation; $E_a$ is the total active earth pressure on the side of foundation; $R_H$ is the friction on the foundation bottom. Among the three parts, the friction force under the foundation maybe influenced by the existence of the monopile. However, the vertical load of an offshore wind turbine is relatively small comparing to other structure, so the compromised friction force won't weaken the resistance too much.

From the way the friction wheel and bucket are in contact with the soil, more soil body was involved in. Although the portion of contribution from each part cannot be determined, the overall result is very promising.

A novel laterally loaded hybrid monopile, friction wheel, and bucket foundation is described herein. A group of centrifuge tests are performed on saturated-loose, saturated-dense, dry-loose and dry dense sand soil condition. Four types of foundation concepts are tested in the experiments to compare with each other: monopile, monopile-friction wheel(MF), monopile-friction wheel-bucket(MFB) with shallow and deep bucket. A monotonic lateral load was acted on the tower of OWT on a height of 3.5 m. The relationship of lateral load and lateral displacement are presented herein. The ultimate lateral bearing capacity of different foundation concepts were determined. The following conclusions can be obtained from the study:

(1) The ability of resisting lateral load of different foundation concepts is in such an order: MFB(deep)>MFB(shallow)>MF>monopile. The addition of friction wheel on the monopile outperform the only monopile foundation, and the addition of bucket component further raises the bearing capacity to a higher level. In saturated loose sand, the bearing capacity of MF is 30% higher than that of monopile, and the bearing capacity of MFB (shallow) is 2.8 times that of monopile. In saturated dense sand, the MF foundation's bearing capacity is nearly 2 times that of monopile, while MFB (shallow) is 2.9 times that of monopile which is similar with the loose sand condition.

(2) The lateral stiffness of different foundations are presented. On plastic deformation phase, the stiffness of MFB foundation is 2~2.5 times that of monopile. This will help the OWT tower obtain the ability of maintaining stable under severe load in ultimate limited states.

(3) The increase of bucket depth from 1m to 2m can enhance the bearing capacity 18% in saturated loose sand and 35% in dense sand. Since the diameter of bucket is pretty large, the relatively shallow is a better choice in terms of performance-cost balance.

(4) From the phenomenon observed in the experiment, the addition of friction wheel and bucket components make more soil body involved into the process. More passive soil pressure was produced by the deflection and rotation of friction wheel and bucket, which increases the resisting capacity of the hybrid foundation.

From the above description of the invention, those skilled in the art will perceive improvements, changes and modifications. Such improvements, changes and modifications within the skill of the art are intended to be covered by the Having described the invention, we claim:

1. A hybrid foundation for an offshore wind turbine comprising:
    an elongated monopile extending from a first end to a distal second along an axis, the first end configured to be inserted into a sea floor,
    a friction wheel having an outer annular surface and an inner annular surface that defines an opening through which the elongated monopile extends, the friction wheel extending transverse to the axis and being configured to increase lateral load bearing capacity of the elongated monopile upon insertion into the sea floor, and
    an annular suction bucket that extends from the friction wheel towards the first end of the elongated monopile, the suction bucket configured to be driven into the sea floor by pressure differentiation within the bucket during installation of the hybrid foundation.

2. The hybrid foundation of claim 1, wherein an upper surface of the friction wheel is configured to extend above the sea floor upon installation of the hybrid foundation.

3. The hybrid foundation of claim 2, wherein the upper surface of the friction wheel extends from the outer annular surface to the inner annular surface.

4. The hybrid foundation of claim 1, wherein the outer annular surface is defined by an outer annular member and the inner annular surface is defined by an inner annular member.

5. The hybrid foundation of claim 4, wherein the outer annular member and the inner annular member define an annular cavity in the friction wheel that is configured to receive and/or be filled with stone, rock, and/or gravel during installation of the hybrid foundation, the stone, rock, and/or gravel configured to provide vertical load to the hybrid foundation.

6. The hybrid foundation of claim 4, wherein the friction wheel includes at least one radially extending stiffener plate that prevents the friction wheel from buckling during and/or after installation of the hybrid foundation.

7. The hybrid foundation of claim 1, wherein a lower surface of the friction wheel is configured to extend substantially parallel to the sea floor.

8. The hybrid foundation of claim 1, wherein the friction wheel is coupled to the suction bucket.

9. The hybrid foundation of claim 1, wherein the suction bucket includes an annular wall that defines a cavity through which the first end of the elongated monopile extends, the annular wall extending along the axis.

10. The hybrid foundation of claim 9, wherein the friction wheel and the suction bucket have the same diameter.

11. The hybrid foundation of claim 10, wherein the friction wheel is integral with the suction bucket.

12. The hybrid foundation of claim 9, wherein the suction bucket is divided into several compartments to increase a stiffness of the suction bucket and maintain balance by controlling a vacuum in different compartments during installation.

13. The hybrid foundation of claim 1, wherein the friction wheel and the suction bucket are coupled to elongated monopile such that resisting moment created by the friction wheel and the suction bucket after installation of the hybrid foundation transfers to the elongated monopile and tower.

14. An offshore wind turbine comprising:
    a hybrid foundation the hybrid foundation including:
    an elongated monopile extending from a first end to a distal second along an axis, the first end configured to be inserted into a sea floor,
    a friction wheel having an outer annular surface and an inner annular surface that defines an opening through which the elongated monopile extends, the friction wheel extending transverse to the axis and being configured to increase lateral load bearing capacity of the elongated monopile upon insertion into the sea floor, and
    an annular suction bucket that extends from the friction wheel towards the first end of the elongated monopile, the suction bucket configured to be driven into the sea floor by pressure differentiation within the bucket during installation of the hybrid foundation.

15. The offshore wind turbine of claim 14, wherein an upper surface of the friction wheel is configured to extend above the sea floor upon installation of the hybrid foundation.

16. The offshore wind turbine of claim 15, wherein the upper surface of the friction wheel extends from the outer annular surface to the inner annular surface.

17. The offshore wind turbine of claim 14, wherein the outer annular surface is defined by an outer annular member and the inner annular surface is defined by an inner annular member.

18. The offshore wind turbine of claim 17, wherein the outer annular member and the inner annular member define an annular cavity in the friction wheel that is configured to receive and/or be filled with stone, rock, and/or gravel during installation of the hybrid foundation, the stone, rock, and/or gravel configured to provide vertical load to the hybrid foundation.

19. The offshore wind turbine of claim 17, wherein the friction wheel includes at least one radially extending stiffener plate that prevents the friction wheel from buckling during and/or after installation of the hybrid foundation.

20. The offshore wind turbine of claim 14, wherein a lower surface of the friction wheel is configured to extend substantially parallel to the sea floor.

* * * * *